United States Patent [19]

Eggleston et al.

[11] Patent Number: 5,427,358
[45] Date of Patent: Jun. 27, 1995

[54] SWEEP FLOW VALVE WITH REMOVABLE VALVE SEAT

[75] Inventors: Philip W. Eggleston; Douglas J. Boyd, both of Marshalltown, Iowa

[73] Assignee: Fisher Controls International, Inc., Clayton, Mo.

[21] Appl. No.: 264,607

[22] Filed: Jun. 23, 1994

[51] Int. Cl.6 ............................................. F16K 51/00
[52] U.S. Cl. .................................. 251/367; 137/454.5
[58] Field of Search ................. 137/454.5; 251/361, 251/367

[56] References Cited

U.S. PATENT DOCUMENTS

| | | | |
|---|---|---|---|
| 745,319 | 12/1903 | Breen . | |
| 940,239 | 11/1909 | Dikkers | 251/361 |
| 1,225,002 | 5/1917 | Beam . | |
| 2,481,214 | 9/1949 | Harper | 251/367 |
| 2,507,851 | 5/1950 | Bryant et al. | 251/361 |
| 3,064,675 | 11/1962 | Johnson et al. | 137/189.5 |
| 3,071,342 | 1/1963 | Allen | 251/171 |
| 3,101,191 | 8/1963 | Wolfensperger | 251/309 |
| 3,123,091 | 3/1964 | Elsey | 137/270 |
| 3,147,950 | 9/1964 | Milleville | 251/214 |
| 3,204,930 | 9/1965 | Brentschneider et al. | 251/361 |
| 3,263,961 | 8/1966 | Varga | 251/332 |
| 3,304,949 | 2/1967 | Baumann | 137/270 |
| 3,572,631 | 3/1971 | Ritchart | 251/210 |
| 3,975,810 | 8/1976 | Siepmann | 29/157.1 R |
| 4,738,277 | 4/1988 | Thomas | 137/454.5 |
| 4,781,325 | 11/1988 | Finders, Jr. | 236/58 |
| 4,934,403 | 6/1990 | Mooney et al. | 137/315 |
| 5,069,423 | 12/1991 | Amorese et al. | 251/361 |

*Primary Examiner*—A. Michael Chambers
*Attorney, Agent, or Firm*—Marshall, O'Toole, Gerstein, Murray & Borun

[57] ABSTRACT

A fluid control valve for controlling fluid flow includes a valve housing having an inlet port, an outlet port, and a passage in the valve housing interconnecting and permitting fluid communication between the inlet port and the outlet port. The passage is substantially smoothly contoured along the length of the interior thereof so that when fluid flows through the passage, the flow of fluid will not substantially increase in turbulence in the passage. The fluid control valve further includes a removable valve seat having an inner flow aperture substantially matching the interior contour of the passage thereby minimizing the turbulence of fluid flow in the passage. A valve element is moveable between a first position wherein fluid flow is permitted through the passage and a second position wherein the valve element sealingly engages the valve seat substantially blocking fluid flow through the passage. The valve seat is removably mounted in the passage.

11 Claims, 2 Drawing Sheets

SWEEP FLOW VALVE WITH REMOVABLE VALVE SEAT

TECHNICAL FIELD

The present invention relates generally to valves and more particularly to a sweep flow valve having a removable valve seat.

BACKGROUND ART

Valves for controlling fluid flow generally include a flow passage extending between an inlet port and an outlet port in a valve housing and a valve element and a valve seat disposed within the flow passage. The valve element is movable between a first position wherein fluid flow is permitted through the passage from the inlet end to the outlet end and a second position wherein the valve element sealingly engages the valve seat substantially blocking fluid flow through the passage.

Moving contact of the valve element with the valve seat causes wear of the valve seat over an extended period of time. Consequently, it is desirable to provide a valve seat which is removable from the valve housing so that the valve seat can be replaced without the need to replace the entire valve housing. Several types of removable valve seat configurations are known in the prior art. In one such configuration, a threaded valve seat may be received by a complementary, threaded bore defined within the valve housing so that the valve seat can be unscrewed and removed from the valve housing when it fails to provide an adequate seal with the valve element in the second or closed position described above. These so-called "screwed in" seat rings are inexpensive, but they can be difficult to replace because the threaded parts, which are constantly submerged in fluid, tend to corrode. As a result, special removal tools are required to remove the threaded valve seat from the valve housing making the removal procedure time-consuming and cumbersome.

A second suggested valve seat configuration employs retaining structure to secure the valve seat in a predetermined position within the valve housing. Removal of these so-called "retained ring" valve seats is not encumbered by corrosion, but the retaining structure is disposed within the fluid flow passage and thus undesirably obstructs fluid flow and increases turbulence within the passage thereby resulting in a decrease in the flow capacity capability of the valve.

Accordingly, it is desired to provide a valve, such as a globe-style valve, having a removable valve seat that is inexpensive and easily replaceable and does not substantially increase turbulence in fluid flowing in the passage.

SUMMARY OF THE INVENTION

In accordance with one aspect of the present invention, a fluid control valve for controlling fluid flow includes a valve housing having an inlet port and an outlet port. A passage in the valve housing interconnects and permits fluid communication between the inlet port and the outlet port. The passage is substantially smoothly contoured along the length of the interior thereof so that when fluid flows through the passage, the flow of fluid will not substantially increase in turbulence in the passage. The fluid control valve further includes a removable valve seat disposed between the inlet and outlet ports and having an inner flow aperture substantially matching the interior contour of the passage thereby preventing the valve seat from substantially increasing turbulence in fluid flowing in the passage and a valve element which is moveable between a first or open position wherein fluid flow is permitted through the passage and a second or closed position wherein the valve element sealingly engages the valve seat substantially blocking fluid flow through the passage. In addition, the valve includes mounting means for removably mounting the valve seat in the passage.

Preferably, the mounting means includes a removable portion of the valve housing adapted to engage the valve seat. In one embodiment, the valve housing includes a bonnet and a valve stem disposed at least partially within the bonnet and coupled to the valve element, and the mounting means is separate from the bonnet. In an alternative embodiment, the mounting means includes a bonnet and a valve stem disposed at least partially within the bonnet and coupled to the valve element.

In accordance with another aspect of the present invention, the valve housing includes separable first and second housing portions and has an inlet port and an outlet port and fastening means for fastening the first and second housing portions of the valve housing together. In this embodiment, the valve housing has interior walls within the first and second housing portions defining a passage interconnecting and permitting fluid communication between the inlet port and the outlet port. The passage has a cross-section without any abrupt changes in cross-sectional dimension to enable smooth fluid flow through the passage without substantially increasing turbulence in fluid flowing in the passage formed in the interior housing walls within the housing. The first housing portion in this embodiment has an annular shouldered portion and a removable valve seat sized and shaped to engage the annular shouldered portion and has an inner flow aperture substantially matching the interior contour of the passage to prevent the valve seat from substantially increasing turbulence of fluid flow in the passage. The second housing portion in this embodiment forces the valve seat against the annular shouldered portion of the first housing portion to secure the valve seat in a predetermined position in the passage.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DESCRIPTION OF THE PREFERRED EMBODIMENTS

Figure 1:
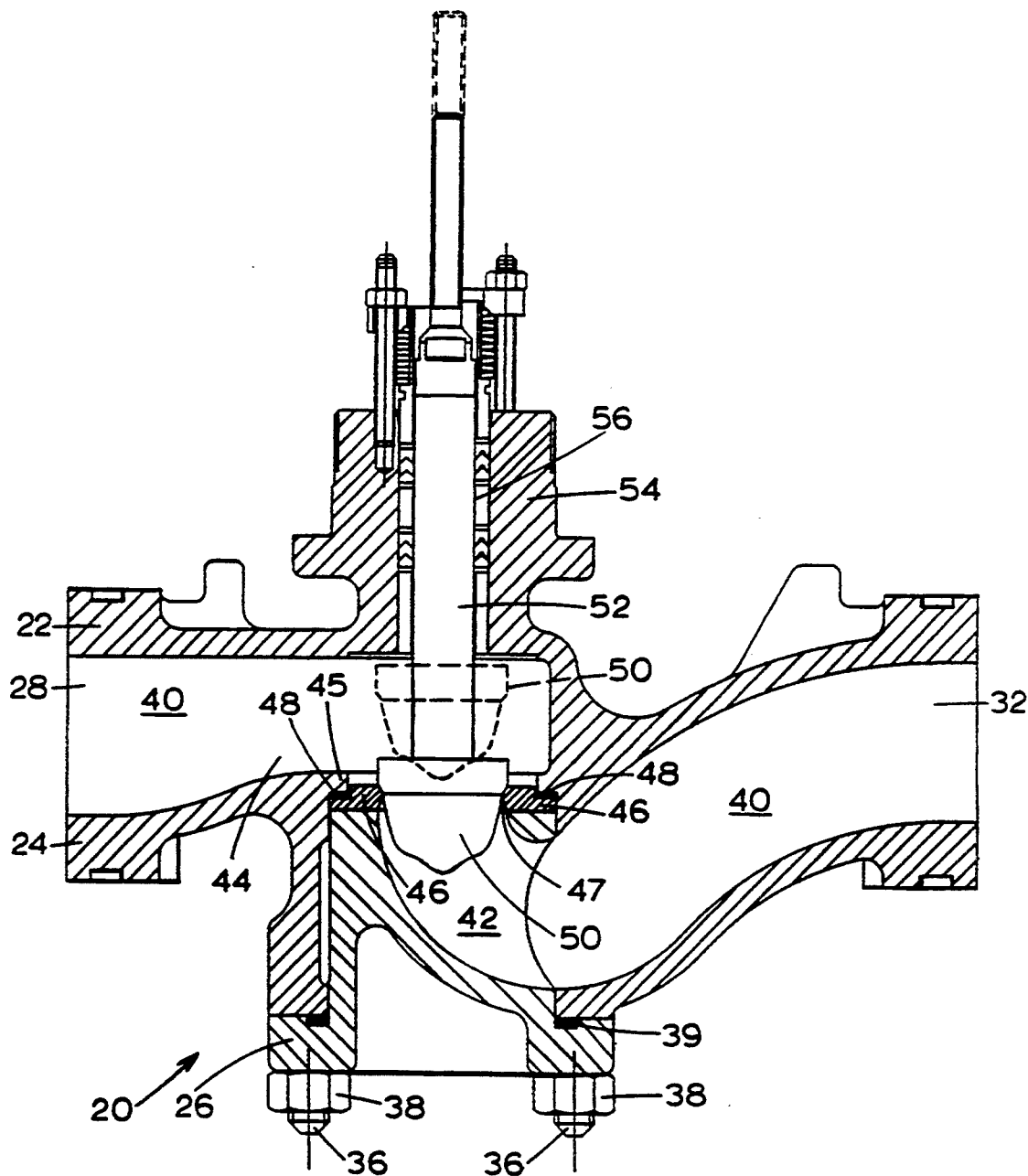
FIG. 1 comprises a sectional view of a bottom-entry embodiment of a globe valve in accordance with the present invention.

Referring initially to FIG. 1, a valve 20 for controlling fluid flow includes a valve housing 22 made up of separable first and second housing portions 24, 26. A plurality of studs 36 extend from the first housing portion 24 and are threaded to receive a corresponding plurality of nuts 38 which cooperate with the studs 36 to fasten the first and second housing portions 24, 26 together to form the valve housing 22. An annular seal 39 is disposed between the first and second housing portions 24, 26 to prevent leakage of fluid from the housing 22. Interior housing walls 40, 42 within the first and second housing portions 24, 26, respectively, define a passage 44 interconnecting and permitting fluid communication between an inlet port 28 and an outlet port 32.

The passage 44 has a cross-section without any abrupt changes in cross-sectional dimension to enable smooth fluid flow through the passage 44 without substantially increasing turbulence of fluid flowing in the passage 44 formed in the interior housing walls 40, 42 within the housing 22.

The first housing portion 24 has an annular shouldered portion 45 which is sized and shaped to be engaged by a complementarily shaped, removable valve seat 46 having an inner flow aperture 47 substantially matching the interior contour of the passage 44 to minimize the turbulence of fluid flow in the passage 44.

The second housing portion 26, is formed with an interior contour matching that of the first housing portion 24 so that the second housing portion 26 will not offer resistance to fluid flow through the valve 20. Moreover, when fastened to the first housing portion 24 by the studs 36 and nuts 38 described above, the second housing portion 26 compressionally forces the valve seat 46 against the annular shouldered portion 45 of the first housing portion 24. Thus, the valve seat 46 is secured in a predetermined position in the passage 44 so that the valve seat 46 does not appreciably affect the interior contour of the passage 44. A gasket 48 of the type currently available commercially is preferably composed of graphite but may be composed of any suitable gasket material and is disposed between the valve seat 46 and the annular shouldered portion 45 of the first housing portion 24 to prevent fluid from leaking around the valve seat 46 and to ensure that the valve seat 46 is compressionally secured in the predetermined position. Significantly, the valve seat 46 could be integral with the second housing portion 26 rather than being a separate piece as shown in FIG. 1. Of course, if the valve seat 46 were integral with the second housing portion 26, the entire second housing portion 26 would have to be replaced in order to replace the valve seat 46.

A valve element 50 is disposed within the passage 44 and is coupled to a valve stem 52 so that the valve element 50 can be moved by axial movement of the valve stem 52 (up and down as shown in FIG. 1). This axial movement is provided by an actuator (not shown) coupled to the valve stem 52. The valve element 50 is moveable between a first or open position (shown in phantom in FIG. 1) wherein fluid flow is permitted through the passage 44 and a second or closed position (shown in solid lines in FIG. 1) wherein the valve element 50 sealingly engages the valve seat 46 substantially blocking fluid flow through the passage 44.

In the embodiment shown in FIG. 1, the first housing portion 24 of the valve housing 22 includes an integral bonnet 54 having an axially extending central bore 56 therein. The valve stem 52 is disposed at least partially within the bore 56 in the bonnet 54 and is coupled to the valve element 50. In this embodiment, the second housing portion 26 is separate from the bonnet 54 and provides means for removably mounting the valve seat 46 in the passage 44 as described above. The removability of the second housing portion 26 permits replacement of the valve seat 46 without removing or disconnecting the actuator from the valve stem 52. The valve seat 46 and the valve element 50 are accessed for replacement by removing the second housing portion 26 (which is separate from the integral bonnet 54 in the bottom-entry embodiment) to provide access to the passage 44 and the valve seat 46.

Figure 2:
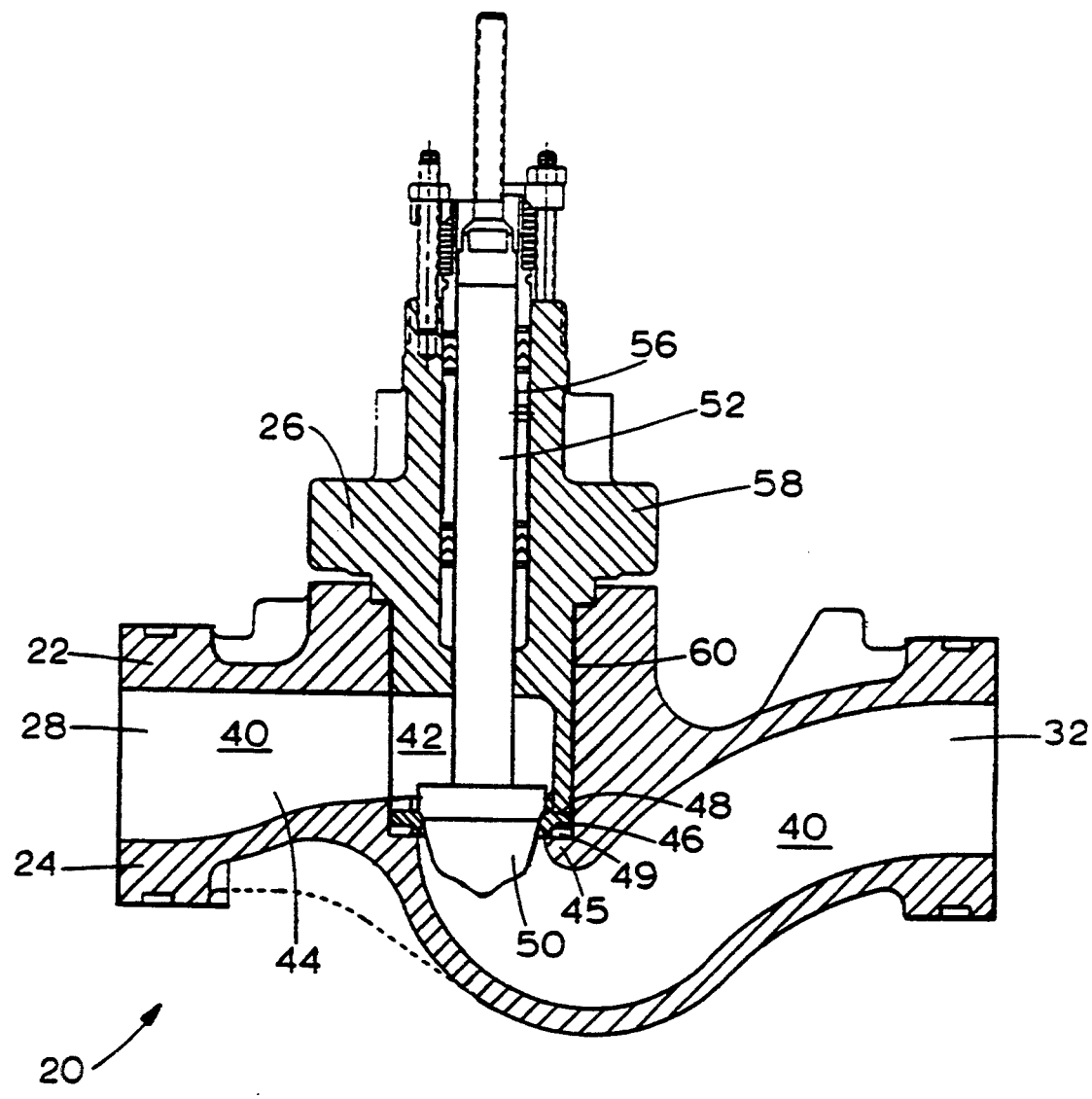
FIG. 2 comprises a sectional view of a top-entry embodiment of the globe valve.

Referring now to FIG. 2, an alternative embodiment is now described. For convenience, elements common between this embodiment and the embodiment described above are assigned identical reference numerals. In the alternative embodiment, the valve housing 22 includes a removable bonnet 58 which comprises at least a part of the second housing portion 26 of the valve housing 22. Thus, the removable bonnet 58 serves to removably mount the valve seat 46 in the passage 44 in place of the second housing portion 26 of the above-described "bottom-entry" embodiment. The removable bonnet 58 of this "top-entry" embodiment may be threaded into a threaded bore 60 formed in the first housing portion 24 of the valve housing 22 or may be secured to the first housing portion 24 by any conventional means, such as by a combination of studs and nuts (not shown in FIG. 2) similar to that used to secure the first and second housing portions 24, 26 together in the bottom-entry embodiment of FIG. 1.

In contrast to the bottom-entry embodiment, the valve seat 46 in this top entry embodiment, is accessed for replacement by removing the bonnet 58 to access the interior of the passage 44 and the valve seat 46.

It should be noted that while the top-entry and bottom-entry embodiments of the present invention have been described as alternatives, a valve 20 could include both a removable bonnet 58 and a removable second housing portion 26 to provide convenient two-way access to internal valve parts for replacement or repair.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A fluid control valve for controlling fluid flow through a pipeline, comprising:
   a valve housing having a first port at a first end and a second port at a second end, wherein the valve housing is adapted to be connected to respective portions of the pipeline at the first and second ends;
   a passage in the valve housing interconnecting and permitting fluid communication between the first port and the second port;
   the passage being contoured along the length of the interior thereof to substantially prevent an increase in turbulence of fluid flowing through the passage;
   a removable valve seat having an inner flow aperture substantially matching the interior contour of the passage thereby preventing the valve seat from substantially increasing turbulence of fluid flow in the passage;
   a valve element movable between a first position wherein fluid flow is permitted through the passage and a second position wherein the valve element sealingly engages the valve seat substantially blocking fluid flow through the passage; and mounting means for removably mounting the valve seat in the passage such that the valve seat can be removed from the valve without disconnecting either of the first and second ends of the valve housing from the respective portions of the pipeline, wherein the mounting means does not substantially increase turbulence of fluid flowing in the passage.

2. The fluid control valve of claim 1, wherein the mounting means comprises a removable portion of the valve housing adapted to engage the valve seat, wherein the removable portion can be removed from the valve housing without disconnecting either of the first and second ends of the valve housing from the respective portions of the pipeline.

3. The fluid control valve of claim 2, wherein the valve housing includes a bonnet and a valve stem disposed at least partially within the bonnet and coupled to the valve element, and wherein the mounting means is separate from the bonnet.

4. The fluid control valve of claim 2, wherein the mounting means comprises a bonnet adapted to engage the valve seat, and wherein the bonnet includes a valve stem disposed at least partially within the bonnet and coupled to the valve element.

5. The fluid control valve of claim 1, wherein the passage is contoured along the length of the interior thereof to substantially minimize the extent to which turbulence of fluid flowing through the passage is increased as a result of the contour of the passage.

6. A fluid control valve for controlling fluid flow through a pipeline, comprising:

a valve housing having an inlet port at an inlet end and an outlet port at an outlet end, wherein the valve housing is adapted to be connected to respective portions of the pipeline at the inlet and outlet ends;

the valve housing having interior housing walls defining a passage interconnecting and providing fluid communication between the inlet port and the outlet port;

the passage defined by said interior housing walls having a cross-section without any abrupt changes in cross-sectional dimension so that the passage does not substantially increase turbulence of fluid flowing through the passage;

a removable valve seat having an inner flow aperture substantially matching the interior contour of the passage substantially preventing the valve seat from increasing turbulence of fluid flow in the passage;

a valve element movable between a first position wherein fluid flow is permitted through the passage and a second position wherein the valve element sealingly engages the valve seat substantially blocking fluid flow through the passage; and mounting means for removably mounting the valve seat in the passage such that the valve seat can be removed from the valve without disconnecting either of the inlet and outlet ends of the valve housing from the respective portions of the pipeline, wherein the mounting means does not substantially increase turbulence of fluid flowing in the passage.

7. The fluid control valve of claim 6, wherein the mounting means comprises a removable portion of the valve housing adapted to engage the valve seat, wherein the removable portion can be removed from the valve housing without disconnecting either of the inlet and outlet ends of the valve housing from the respective portions of the pipeline.

8. The fluid control valve of claim 7, wherein the valve housing includes a bonnet and a valve stem disposed at least partially within the bonnet and coupled to the valve element, and wherein the mounting means is separate from the bonnet.

9. The fluid control valve of claim 7, wherein the mounting means comprises a bonnet adapted to engage the valve seat, and wherein the bonnet includes a valve stem disposed at least partially within the bonnet and coupled to the valve element.

10. The fluid control valve of claim 6, wherein the passage is contoured along the length of the interior thereof to substantially minimize the extent to which turbulence of fluid flowing through the passage is increased as a result of the contour of the passage.

11. A fluid control valve for controlling fluid flow through a pipeline, comprising:

a valve housing including separable first and second housing portions and having an inlet port at an inlet end and an outlet port at an outlet end, wherein the valve housing is adapted to be connected to respective portions of the pipeline at the inlet and outlet ends;

fastening means for fastening the first and second housing portions of the valve housing together;

the valve housing having interior housing walls within the first and second housing portions defining a passage interconnecting and permitting fluid communication between the inlet port and the outlet port;

the passage having a cross-section without any abrupt changes in cross-sectional dimension so that the passage does not substantially increase turbulence of fluid flowing through the passage;

the first housing portion having an annular shouldered portion;

a removable valve seat sized and shaped to engage the annular shouldered portion of the first housing portion and having an inner flow aperture substantially matching the interior contour of the passage to prevent the valve seat from substantially increasing turbulence of fluid flow in the passage;

the second housing portion forcing the valve seat against the annular shouldered portion of the first housing to secure the valve seat in a predetermined position in the passage, wherein the valve seat can be removed from the valve housing without disconnecting either of the inlet and outlet ends of the valve housing from the respective portions of the pipeline; and a valve element movable between a first position wherein fluid flow is permitted through the passage and a second position wherein the valve element sealingly engages the valve seat substantially blocking fluid flow through the passage.

* * * * *